(12) United States Patent
Chung

(10) Patent No.: US 6,811,026 B2
(45) Date of Patent: Nov. 2, 2004

(54) COMPACT DISC TRAY

(76) Inventor: Geal Hyub Chung, 3642 Claridge Ct., Simi Valley, CA (US) 93063

( * ) Notice: Subject to any disclaimer, the term of this patent is extended or adjusted under 35 U.S.C. 154(b) by 152 days.

(21) Appl. No.: 10/167,993

(22) Filed: Jun. 11, 2002

(65) Prior Publication Data

US 2003/0226775 A1 Dec. 11, 2003

(51) Int. Cl.⁷ .............................. B65D 85/57
(52) U.S. Cl. ................. 206/311; 206/308.1; 206/232; 206/815; 206/310
(58) Field of Search ................ 206/311, 309, 206/307.1, 308.1, 308.3, 425, 509, 503, 232, 310, 813, 815; 211/40, 41.12

(56) References Cited

U.S. PATENT DOCUMENTS

| | | | | |
|---|---|---|---|---|
| 4,030,138 A | * | 6/1977 | Hillier | 360/135 |
| 4,138,703 A | | 2/1979 | Stave et al. | 360/133 |
| 4,463,849 A | | 8/1984 | Prusak et al. | 206/307 |
| 4,463,850 A | | 8/1984 | Gorog | 206/309 |
| 5,011,010 A | | 4/1991 | Francis et al. | 206/307 |
| 5,284,243 A | * | 2/1994 | Gelardi et al. | 206/308.1 |
| 5,360,107 A | | 11/1994 | Chasin et al. | 206/313 |
| 5,477,961 A | * | 12/1995 | Taniyama | 206/310 |
| 5,655,656 A | | 8/1997 | Gottlieb | 206/308.1 |
| 5,709,300 A | | 1/1998 | Bolognia et al. | 206/308.1 |
| 5,715,948 A | * | 2/1998 | Hung | 211/40 |
| 5,746,314 A | | 5/1998 | Knutsen et al. | 206/308.1 |
| 5,775,491 A | | 7/1998 | Taniyama | 206/308.1 |
| 5,988,375 A | * | 11/1999 | Chang | 206/308.1 |
| 6,179,121 B1 | * | 1/2001 | Ferguson et al. | 206/311 |
| 6,182,825 B1 | | 2/2001 | Butcher | 206/308.1 |
| 6,216,863 B1 | | 4/2001 | Williamson et al. | 206/308.1 |
| 6,283,281 B1 | | 9/2001 | Pandolph et al. | 206/308.1 |
| 6,283,285 B1 | | 9/2001 | Ikebe et al. | 206/310 |
| 6,568,526 B1 | * | 5/2003 | Reinhardt et al. | 206/310 |

* cited by examiner

Primary Examiner—Jila M. Mohandesi
(74) Attorney, Agent, or Firm—Ladas & Parry LLP

(57) ABSTRACT

Disclosed is a housing device for compact disks. The housing device includes stackable and bookbindable CD trays, each of which has clip pegs with a hole defined at a center portion of each CD tray. A compact disc can be released by pushing a non-data portion thereof through a release opening defined adjoining the hole in each CD tray. An adhesive tape can be affixed to one side ends of the CD trays and a lock band can be attached to the other side ends of the CD trays, to bookbind the CD trays together.

1 Claim, 4 Drawing Sheets

COMPACT DISC TRAY

CROSS REFERENCE TO RELATED US PATENT

The application is related to U.S. Pat. No. 6,712,203 filed on Sep. 28, 2001 and granted on Mar. 30, 2004.

BACKGROUND OF THE INVENTION

1. Field of the Invention

The present invention relates to a compact disc (CD) tray and CD trays which are bound into a bundle to allow compact discs to be stored in an ordered fashion.

2. Description of the Related Art

A compact disc is a device employing a laser beam technology for retrieving data signals recorded along micro tracks on a plastic diskette, and is commonly called a CD. Since Phillips and Sony first introduced prototypes in the late 1970s, CDs have improved rapidly as a reliable storage system for all types of data, as well as video images, audio signals, etc.

In spite of its indisputable merits, however, sheltering of the CD in a cassette was a difficult problem to be resolved. Therefore, a flip-open type case, which was adopted at the beginning, still dominates its market. In this regard, the conventional flip-open type cases by their nature hardly allow their storage as a bundle binding, and so are required to be used separately. The conventional flip-open type cases are tremendously inconvenient to use, such as for indexing, archiving, publishing, and so on. Thus, the conventional flip-open cases are often replaced with other bundle housing types, such as CD pouches, CD cabinets, CD frames, etc. Therefore, if there were some simple ways capable of allowing the CD cases to be book-bound, it would be most ideal for suffering computer users.

While there have been various excellent ideas on the market up to now, they are not yet successful in terms of practical usage, manufacturing, pricing or archiving, in particular, in digital publishing or large or small scale categorized storage of CDs.

SUMMARY OF THE INVENTION

Accordingly, the present invention has been made in an effort to solve the problems occurring in the related art, and an object of the present invention is to eliminate one side covering of a CD case by means of book-binding.

Unlike the conventional CD cases, the present invention focuses on the protection of a CD's data-written land by overlaying one tray over another into the shape of a booklet, which will overcome the CD shortcomings as stated above.

Further, the present invention includes other various detailed features and thereby solves the problems of the conventional flip-open type CD cases.

Moreover, the present invention is also ideally suited to digital publishing and archiving by its peculiar bookbindability. As well, by employing this idea, a blank CD with a reasonable extra cost for a casing can expand its market range to a great extent.

In one embodiment, a CD tray according to the invention consists of two major characteristics. One is a tray body with a thinnest possible thickness, which has a circular basin with a minimal depth to accommodate a compact disc, and the other is a fingertip opening, that is, a release opening which is defined adjoining a center hole of a CD holder plate. Holder fins, that is, clip pegs are formed on an inner edge of the CD holder plate, which defines the center hole.

At least one side end surface of the CD tray is made flat so that the CD tray can be book-bound using an adhesive tape or any other suitable means, whereby CD trays bound can be flipped one by one like ordinary book pages. As a consequence, any selected CD on a tray can be released instantly by pushing a non-data land portion of the CD with one fingertip through the release opening.

Since the fingertip opening of the CD holder plate according to the present invention is shaped in a unique manner, even a woman's fingertip with a long nail can release the CD without any difficulty.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
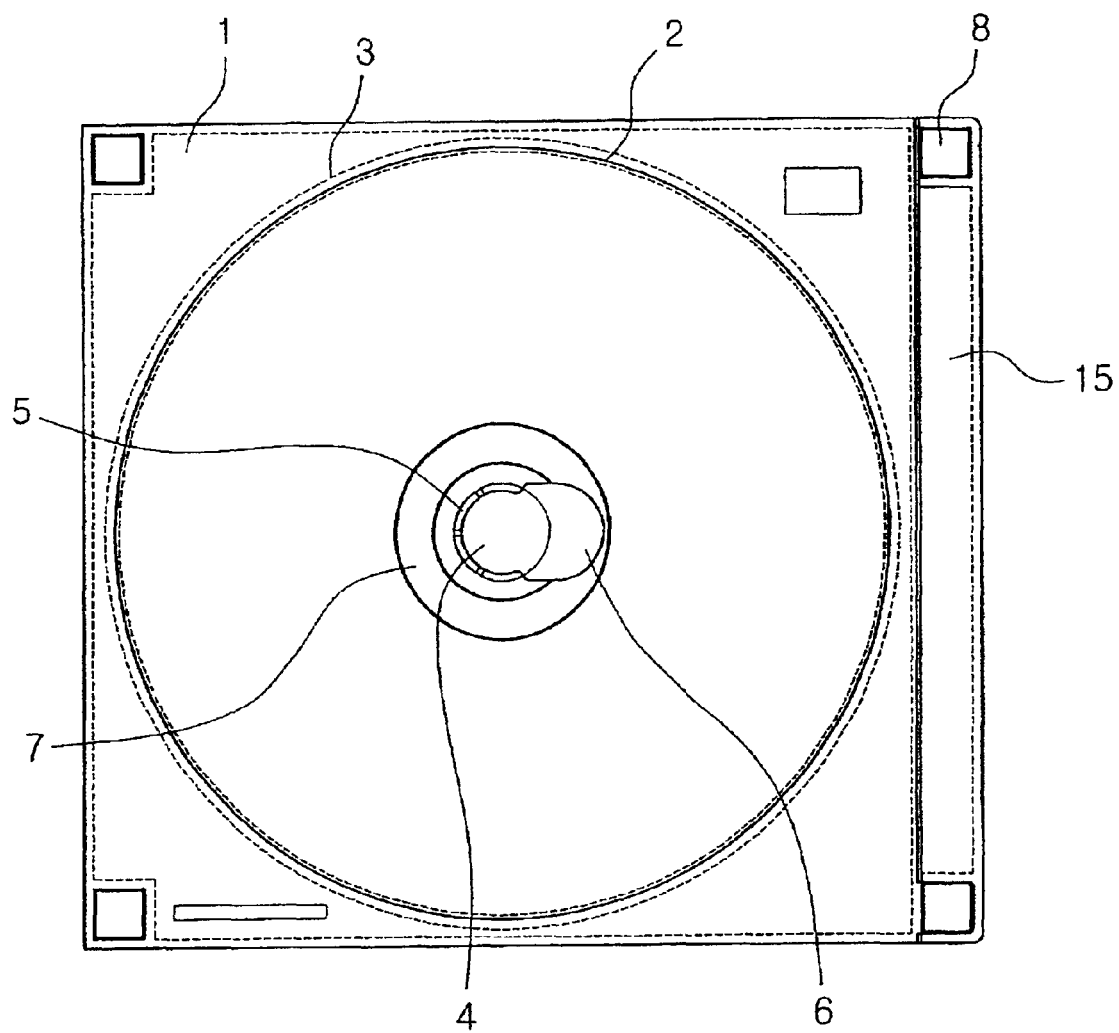
FIG. 1 is a plan view illustrating a state wherein a compact disc is accommodated in a CD tray in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Referring to FIG. 1, there is shown a plan view illustrating a state wherein a compact disc is accommodated in a CD tray in accordance with an embodiment of the present invention. The CD tray comprises a CD holder plate 1. A circular depression 3 in which the compact disc 2 is accommodated is formed on an upper surface of the CD holder plate 1. The CD holder plate 1 is defined, at a center portion thereof, with a hole 4. Clip pegs 5 are formed on an inner edge of the CD holder plate 1, which defines the hole 4, in a manner such that they are spaced apart one from another in a circumferential direction. A release opening 6 is defined adjacent to and communicated with the hole 4.

The CD holder plate 1 according to the present invention can be made of a suitable material, for example, plastic as in the conventional art. In the case of storing compact discs which are used for special purposes such as long-term keeping of a data base, broadcast recording, and the like, the CD holder plate 1 can be made of metal.

The standard compact disc 2 has marginal portions at inner and outer edges thereof so that a central data-written land is protected. The marginal portions serve as non-data disc lands 7.

Figure 2:
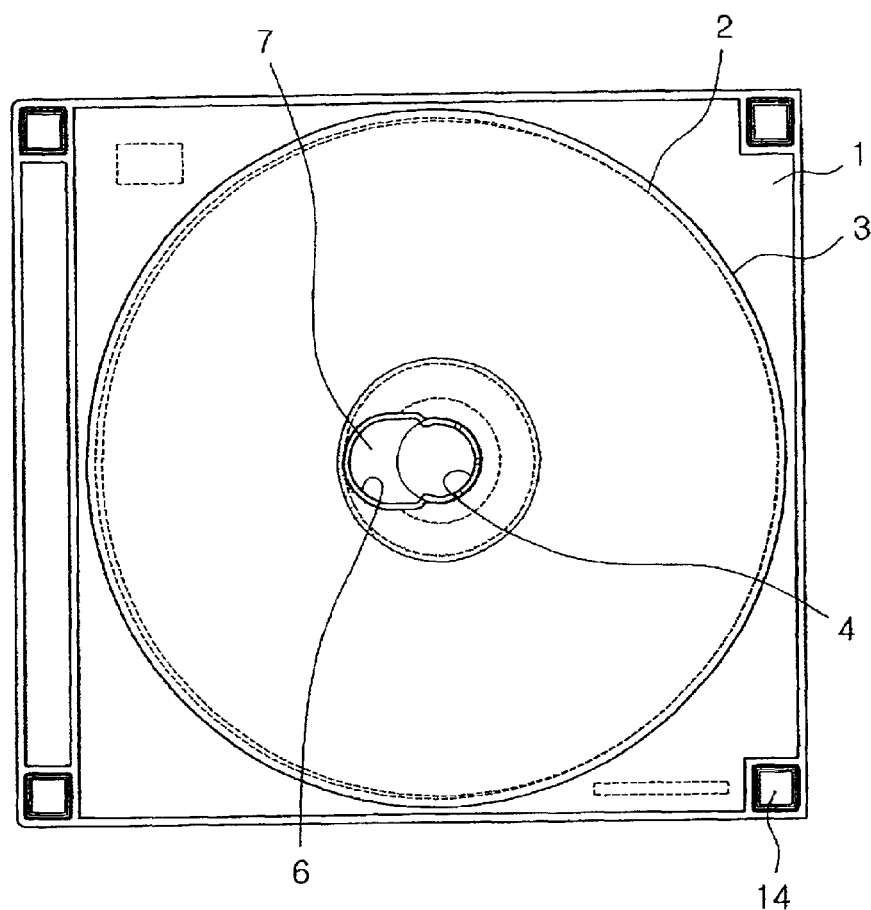
FIG. 2 is a bottom view of FIG. 1.
Figure 3:
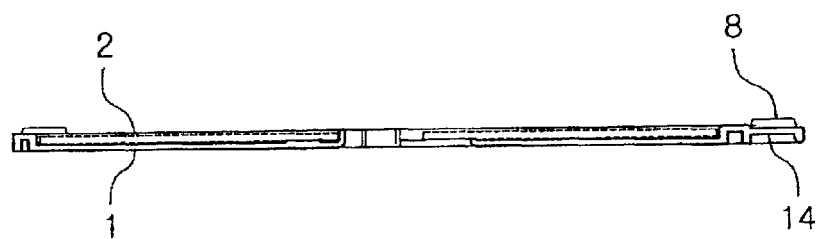
FIG. 3 is a front longitudinal cross-sectional view of FIG. 1.

In FIGS. 1 through 3, the compact disc 2 is illustrated in a state wherein it is accommodated in the circular depression 3 of the CD holder plate 1 according to the present invention. The compact disc 2 loaded onto the CD tray is securely maintained in the circular depression 3, that is, a circular basin, with a minimum gap defined between a circular rim delimiting the circular depression 3 and the outer edge of the compact disc 2, so that the compact disc 2 cannot be released from the CD holder plate 1 unless a portion of the non-data disc land 7 of the compact disc 2 is pushed with a fingertip through the release opening 6. The hole 4 defined at the center portion of the CD holder plate 1 will help the fingertip to easily find the release opening 6 even in dark circumstances.

Referring to FIGS. 1 through 3, four engagement projections 8 are respectively formed at four corners and on an upper surface of the CD holder plate 1, and four engagement grooves 14 are defined below the engagement projections 8. Therefore, the engagement projections 8 of one CD holder plate 1 can be respectively engaged into the engagement grooves 14 of another CD holder plate 1. Consequently, when the CD holder plates 1 are stacked one upon another, they are locked one to another and prevented from being unintentionally moved in a horizontal direction, which ensures a well arranged book shape.

At least one side end of the CD tray is formed as a flat surface. Hence, when several CD trays are stacked one upon another, one side end surfaces are arranged in line. In this state, by affixing an adhesive tape 11 to one side end surfaces of the CD trays and joining a flip member 9 and a cover member 10 to upper and lower ends of the adhesive tape 11, respectively, the CD trays can be effectively bound in the shape of a booklet. A lock band 12 is provided on the other side ends of the CD trays to connect distal ends of the flip and cover members 9 and 10 with each other. In order to ensure that the lock band 12 is attached to the distal ends of the flip and cover members 9 and 10, Velcro-brand hook and loop fastener strips 13 are stitched to a lower surface of the lock band 12 adjacent to both ends thereof. A person skilled in the art will readily appreciate that complementary Velcro-brand hook and loop fastener strips can be stitched to the distal ends of the flip and cover members 9 and 10.

Adjacent to the other side end, a slightly recessed portion 15 is formed between two engagement projections 8 of each CD holder plate 1, so that a label or the like can be attached to the recessed portion 15. Therefore, since a CD categorizing position is fixed, an archiving task can be implemented in an efficient manner.

Figure 4:
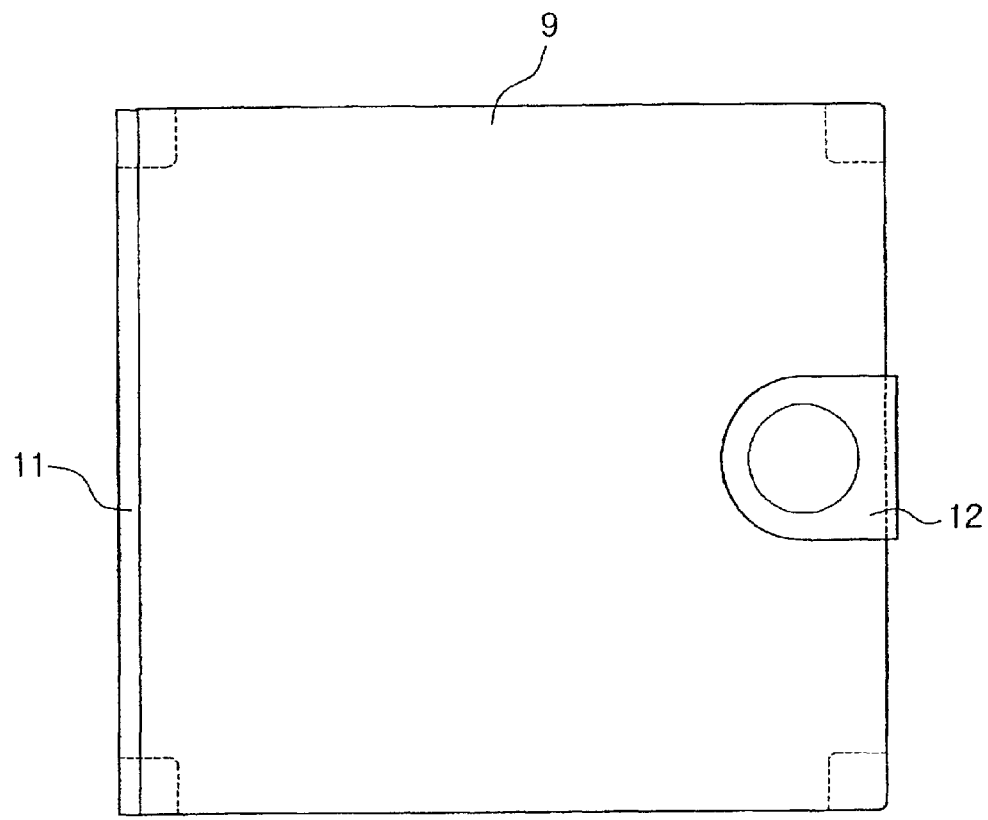
FIG. 4 is a front view illustrating a state wherein a plurality of CD trays according to the present invention are stacked one upon another and book-bound using an adhesive tape and a lock band.
Figure 5:
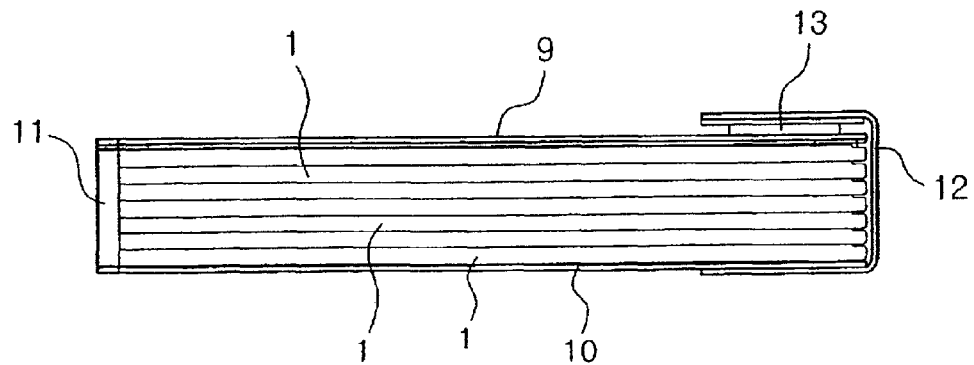
FIG. 5 is a plan view of FIG. 4.
Figure 6:
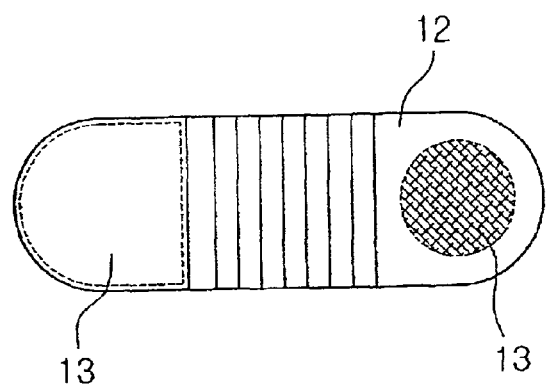
FIG. 6 is a bottom view independently illustrating the lock band.
Figure 7:
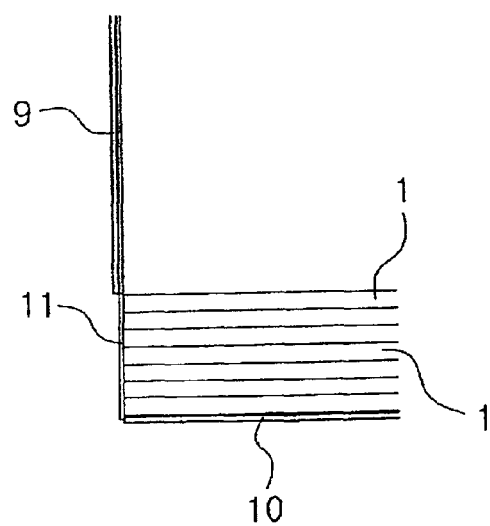
FIG. 7 is a partial front view illustrating a state wherein an upper flip member is opened from the book-bound CD trays.

As can be readily seen from FIGS. 4 and 7, because flip motion of the CD tray is permitted substantially in a vertical direction, CD surfaces are kept from being scratched or damaged in a transverse direction.

As apparent from the above description, the CD tray according to the present invention, constructed as mentioned above, provides advantages in that, differently from the conventional flip-open type case, by simply turning over a CD holder plate as in the case of a booklet, a desired compact disc can be easily found.

Specifically, due to the presence of a release opening, the compact disc can be easily released from the corresponding one of the CD holder plates bound in the shape of the booklet. As a consequence, the CD tray according to the present invention will appeal to publishers of software, music, a DVD, a digital book, etc.

Due to the fact that the CD trays according to the present invention can be easily bound in the shape of the booklet, papers for additional information or book-wrappers can be easily provided to the resultant bundle. Further, the CD trays according to the present invention can be stored and displayed on a book shelf without requiring a separate archiving system, whereby convenience is rendered upon filing or indexing contents.

Upon producing the CD tray according to the present invention, it is sufficient to add or remove some parts without changing the entire existing production system and/or packaging system.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A CD tray comprising:
   a CD holder plate defined with a circular depression for accommodating a CD and a center hole, and having clip pegs which are formed on an inner edge of the CD holder plate, defining the center hole, to fixedly maintain the CD, the CD holder plate being further defined with a release opening which is communicated with the center hole in a manner such that the CD can be easily released from the CD holder plate when it is pushed by a fingertip through the release opening,
   engagement projections respectively formed at four corners and on an upper surface of the CD holder plate, with four engagement grooves being defined below the engagement projections, in a manner such that, when CD holder plates are stacked one upon another, the engagement projections of one CD holder plate can be respectively engaged into the engagement grooves of another CD holder plate, to prevent the CD holder plates from being unintentionally moved in a horizontal direction, wherein,
   when the CD holder plates are stacked one upon another, they are bound in the shape of a booklet in a manner such that an adhesive tape is affixed to one side end surfaces of the CD holder plates, a flip member and a cover member are joined to upper and lower ends of the adhesive tape, respectively, a lock band having stitched to a lower surface thereof hook and loop fastener strips is provided on the other side ends of the CD holder plates to connect distal ends of the flip and cover members with each other, whereby a desired CD can be easily found by simply turning over CD holder plates as in the case of the booklet.

* * * * *